Jan. 28, 1958 G. P. WACHTELL 2,821,705
CONTROL CIRCUIT FOR A BEACON TRANSPONDOR
Filed Feb. 27, 1946
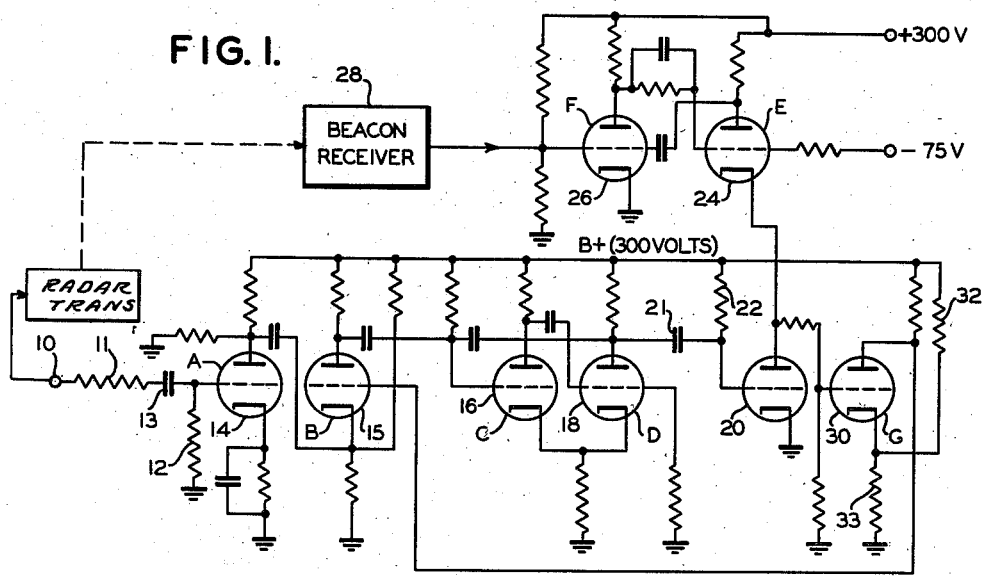
FIG. 1.
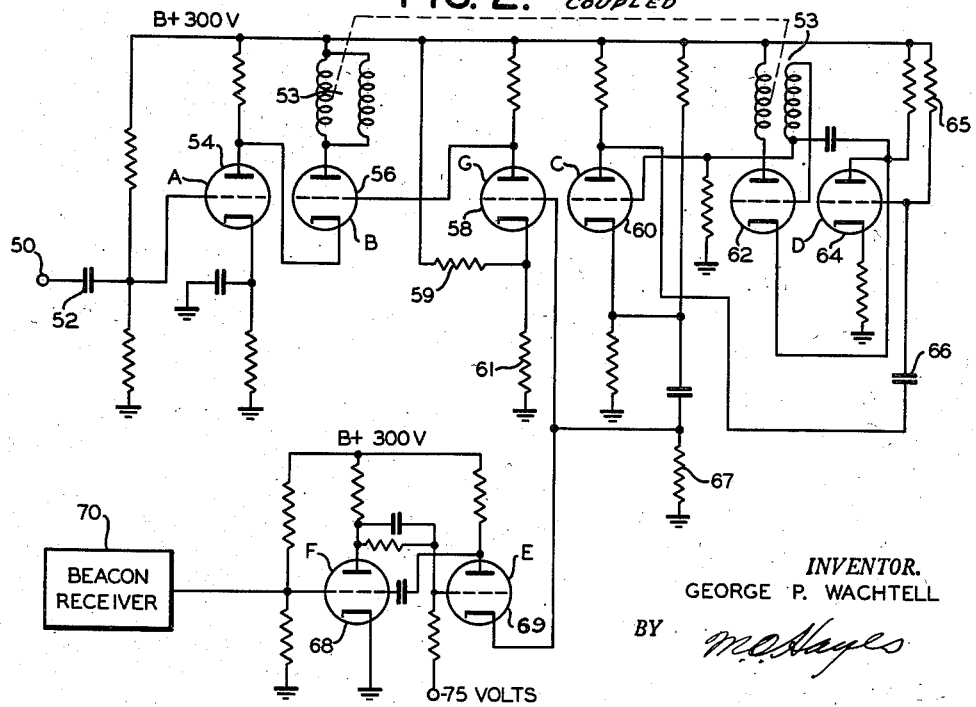
FIG. 2. INDUCTIVELY COUPLED
*INVENTOR.*
GEORGE P. WACHTELL
BY
ATTORNEY

United States Patent Office 2,821,705
Patented Jan. 28, 1958

2,821,705

CONTROL CIRCUIT FOR A BEACON TRANSPONDOR

George P. Wachtell, Princeton, N. J., assignor, by mesne assignments, to the United States of America as represented by the Secretary of the Navy Application February 27, 1946, Serial No. 650,694

12 Claims. (Cl. 343—101)

This invention relates to beacon systems, and more particularly to a suppressor circuit for disabling the beacon transmitter when a nearby radar fires.

Beacons are frequently employed in aircraft to provide navigation and position information to ground radars. Should the plane carrying the beacon equipment also carry radar, a suppressor circuit is necessary to prevent the beacon from responding to this radar, such response being obviously undesirable because of duty-cycle limitations. It is essential, however, that the beacon transmitter not be disabled indiscriminately every time the plane's radar fires. Should the beacon, shortly after a normal reply, be suppressed by firing of the plane's radar, it would be capable of being turned on again immediately after the suppression interval. Since the beacon transmitter requires a definite time to recover, a normal interrogation occurring immediately after the suppression interval would cause the transmission of a poor pulse. It is, therefore, necessary to have means of suppressing the suppressor under such circumstances.

It is an object of this invention, therefore, to provide apparatus for disabling a beacon transmitter.

It is another object to provide apparatus for generating, in response to a trigger from an adjoining radar, a pulse which will disable a multivibrator.

A further object is to provide apparatus for disabling a beacon transmitter in response to a trigger, while preventing such disablement when the beacon has been normally interrogated.

These and other objects will be more apparent upon consideration of the following specification, taken in connection with the accompanying drawings, forming a part thereof, in which:

Fig. 1 is a schematic drawing of one embodiment of the invention; and

Fig. 2 is a schematic drawing of a second embodiment of the invention.

Referring to both forms of the invention as shown in Figs. 1 and 2, the invention includes generically, an amplifier A for amplifying and inverting the positive trigger from the plane's radar. The resulting negative trigger is applied to switch tube B, which is normally a closed circuit. This trigger initiates a multivibrator, comprising tubes C and D, which generates a disabling pulse. This pulse is used to disable the normally-off stage, E, of the beacon gate multivibrator, the whole multivibrator comprising tubes E and F. Switch control tube G opens switch tube B only if the normally-off stage E of the beacon gate multivibrator has been turned on by an external radar challenge. This action prevents the initiating trigger from reaching the multivibrator which produces the suppression pulse.

Considering the embodiment shown schematically in Fig. 1, a positive trigger from the plane's radar is applied to terminal 10 and connected through an RC network comprising resistors 11 and 12 and condenser 13 to the grid of amplifier tube 14. Tube 14 amplifies the trigger and couples it as a negative signal to the cathode of switch tube 15. This tube is normally a closed circuit to the trigger, the grid being at approximately the same voltage as the cathode, as will be shown later. This negative signal appears, then, at the plate of tube 15 and is coupled to the grid of tube 16. Tubes 16 and 18 with their associated circuits constitute a conventional one-shot multivibrator. Tube 16 is the normally on-stage, and the application of the negative trigger to its grid cuts off this stage and turns on tube 18, thereby producing a negative gate at the plate of this latter tube. The circuit constants are so chosen that tube 18 produces a negative gate which is longer in time duration than the desired suppression time.

This negative gate is applied to the grid of tube 20, which is normally conducting, and cuts off this tube until condenser 21 charges to a value at which the tube can against conduct. The time for condenser 21 to charge depends partly on the time constant of condenser 21 and resistor 22, this being so selected that in the present embodiment tube 20 is cut off for about 25 microseconds. As previously stated, the negative gate produced at the plate of tube 18 is somewhat longer than this selected suppression time of 25 microseconds.

The plate of tube 20 is connected to the cathode of the normally off-stage 24 of the beacon gate multivibrator. This multivibrator, comprising tubes 24 and 26, serves to initiate the operation of the beacon transmitter. It is turned on by a video signal from beacon receiver 28, the negative signal being applied to the grid of the normally-on stage 26. However, the trigger from the plane's radar has resulted in tube 20 being cut off for 25 microseconds. Therefore, as long as tube 20 is cut off, the off-stage 24 of the gate multivibrator has a high impedance from cathode to ground and cannot turn on. The signal from beacon receiver 28, resulting from the firing of the plane's radar, fails to trigger the beacon gate, and the beacon therefore does not reply to the radar which triggered the suppressor.

The indiscriminate suppressing, or disabling, of the gate multivibrator is undesirable, however. Assume that a normal interrogation has turned on the beacon gate multivibrator and thereupon fired the beacon transmitter, and that 50 microseconds later the plane's radar fires and operates the suppressor. The beacon gate, which may be 500 microseconds wide, would be turned off, and when the suppressor finished its action 25 microseconds later, the gate would be capable of again being turned on. This is objectionable because the beacon's duty cycle is limited, and another interrogation before the transmitter has had time to recover would effect the transmission of a poor pulse. To eliminate this possibility, use is made of the fact that when the beacon gate multivibrator has been triggered and tube 24 is conducting, there is voltage from the plate of tube 20 to ground. Tube 30 is cathode biased by means of resistors 32 and 33 so that when tube 24 is not conducting and the grid of tube 30 is at zero voltage with respect to ground, tube 30 is cut off. This is the quiescent condition. Under these circumstances, the plate of tube 30, and hence the grid of tube 15, will be at approximately the same voltage as the cathode of tube 15. Switch tube 15 therefore is a closed circuit to the initiating trigger, as stated before. When, however, tube 24 is conducting, the grid of tube 30 is raised to a sufficient voltage to turn on the tube. The voltage at the plate of tube 30, and on the grid of tube 15, is greatly reduced. The switch tube 15 now becomes an open circuit to the initiating trigger and the suppressor action is suppressed.

In summary, if the beacon has not been interrogated by an external radar, switch tube 15 is conducting and passes the initiating trigger. When the beacon has been normally interrogated, and tube 24 is conducting, the bias on tube 15 is increased as a result of tube 30 conducting, and switch tube 15 will not pass the initiating trigger necessary to start suppressor action.

In the embodiment just described it is essential that the distributed capacitance from the cathode of tube 24 to ground be small or, even with tube 20 cut off, there is not a high enough impedance to keep the beacon gate multivibrator successfully suppressed. Should it be desirable to put the suppressor in a separate box, this distributed capacitance becomes relatively large because of interconnecting cables and the embodiment described in connection with Fig. 2 may be desirable.

In this embodiment a novel fast-rising multivibrator is used to charge up the capacity to ground of the wire connecting the cathode of the beacon gate multivibrator to the suppression circuit.

Referring to Fig. 2, a positive trigger from the plane's radar is applied to terminal 50 and is coupled to the grid of tube 54 through condenser 52. The tube is self-biased very nearly to cut-off, in the present embodiment the plate being about 170 volts above the cathode, so that the maximum negative signal appearing at the plate of tube 54 is 170 volts in amplitude. Tube 60 and 68 comprise the beacon gate multivibrator, tube 69 being the normally-off stage. With this stage non-conducting, the grid of tube 58 is at ground potential. A voltage divider made up of resistors 59 and 61 fixes the cathode voltage of this tube so that it is cut-off while the grid is at ground. With tube 58 cut-off the grid of tube 56 is at approximately the same voltage as the cathode, and this switch tube 56, therefore, passes the negative trigger which is applied to its cathode. Pulse transformer 53, having a plurality of inductively coupled windings, couples the trigger as a positive signal to the grid of tube 62. The grid of tube 62 is normally at ground potential while the cathode is at a sufficiently positive voltage to cut off the tube. The positive trigger applied to the grid renders tube 62 conducting and starts its operation as a bootstrap blocking oscillator, the circuit arrangement being similar to that described in the copending application of George P. Wachtell, titled "Electrical Apparatus," Serial No. 623,392, filed October 19, 1945. When tube 62 blocks, the resulting fast-rising signal turns on tube 60, which, with tube 64 and associated circuits comprises a multivibrator, tube 60 being normally cathode-biased off. This results in a fast-rising signal on the cathode of tube 60, the length of the positive pulse being the length of time tube 64 is cut off. This time depends partly on the values of resistor 65 and condenser 66, which are so chosen in the present embodiment as to make the width of the positive suppression pulse about 25 microseconds. In this case the positive signal produced at the cathode of tube 60 is approximately 60 volts high, with a spike on the front of about 10 volts corresponding to the firing of tube 62. This signal is applied to the cathode of tube 69 and prevents this stage from turning on in response to a signal received from beacon receiver 70.

Should the beacon gate multivibrator be triggered by a signal from an external radar, it is necessary that the suppressor be suppressed. Accordingly, if the normally-off stage 69 has been rendered conducting, a positive voltage is applied to the grid of tube 58 due to the flow of cathode current through resistor 67. This turns on tube 58 and drops its plate voltage, and accordingly, the grid voltage of tube 56, to such a value that tube 56 is rendered an open circuit to the initiating trigger. Suppressor action is thereby effectively prevented.

In summary, an initiating trigger from the plane's radar is connected through switch tube 56 to the fast-rising multivibrator only if the beacon gate multivibrator has not been triggered by a normal radar interrogation. If the gate multivibrator has been triggered, the bias on switch tube 56 is increased so as to render the tube non-conducting and the trigger is prevented from initiating the suppressor action.

It is believed that the construction and operation of my invention, as well as the advantages thereof, will be apparent from the foregoing description. It will be understood that while I have shown and described my invention in two particular embodiments, changes may be made in the circuits disclosed without departing from the invention, as sought to be defined in the following claims.

What is claimed is:

1. The combination with a beacon system having a receiver and a responder stage coupled thereto of a suppressor circuit for said stage comprising, means for coupling a voltage pulse from a locally located radar system to said beacon system, means normally responsive to said pulse for disabling the responder stage for the duration of said pulse including a normally closed electronic switch for coupling said voltage pulse from said locally located radar system to said disabling means for effecting the disablement of said responder stage, and means for opening said electronic switch and rendering said disabling means inoperative during periods of operation of said beacon responder stage already initiated in response to voltage pulses from a remotely located radar system.

2. In combination with a beacon system multivibrator having a normally nonconducting tube element, a suppressor circuit for disabling said multivibrator comprising, an amplifier responsive to a locally generated signal, a second amplifier tube coupled to said first amplifier normally transferring a signal therefrom, a multivibrator responsively coupled for actuation by said transferred signal, a third amplifying tube series connected in the cathode circuit of said normally nonconducting tube element and normally biased for conduction, a fourth tube arranged to be normally nonconducting, means responsive to conduction of said third amplifying tube in said cathode circuit of the first-named multivibrator for rendering said fourth tube conducting and means responsive to conduction in said fourth tube applied to said second tube to deny signal transfer therein while said cathode circuit is completed through said third tube.

3. In combination with a beacon system multivibrator having a normally nonconducting tube element, a suppressor circuit for disabling said multivibrator comprising, an amplifier responsive to a locally generated signal, a second amplifier tube coupled to said first amplifier normally transferring a signal therefrom, a one-shot multivibrator circuit responsively coupled for actuation by said transferred signal, a third amplifying tube normally biased for conduction and coupled for nonconduction upon operation of the one-shot multivibrator, a fourth amplifier tube arranged to be normally nonconducting, means responsive to conduction in said nonconducting element of the first-named multivibrator rendering last said tube conducting in response to current in said nonconducting element, means responsive to conduction in said fourth tube for preventing conduction of said second tube, and means including said second multivibrator and said third amplifying tube preventing operation of first said multivibrator when second said amplifying tube is already nonconducting.

4. In combination with a beacon system multivibrator having a normally nonconducting tube element including a circuit from a cathode thereof, a suppressor circuit for disabling said multivibrator comprising, an amplifier responsive to a locally generated signal, a second amplifier tube coupled to said first amplifier normally transferring a signal therefrom, a one-shot multivibrator circuit responsively coupled for actuation by said transferred signal, a third amplifying tube connected and biased for normal conduction, a fourth amplifier tube arranged to be normally nonconducting and conducting in response to current in said cathode, means responsive to conduction in said fourth tube applied to said second tube to deny conduction therein, and means including said second multivibrator and said third amplifying tube preventing operation of first said multivibrator when said fourth tube is conducting, whereby the suppressor circuit is alternatively operative to quench the first multivibrator if the same is not operated and to quench the suppression when operated.

5. In a beacon responder for use adjacent a radar transmitter and having a receiver and control circuit for initiating a transmission sequence in response to a received signal including a normally nonconducting tube rendered conductively operative during said sequence, a suppressor circuit for said tube comprising, an amplifier responsively coupled to the transmitter, impedance means in series with said tube selectively of normally low value to permit operation thereof and of high value to prevent said operation, means responsive to radar pulse signals in the amplifier in control of said impedance means imposing said high value thereof for the duration of said pulse signals, and means responsive to conductive operation of said tube preventing said imposition of high impedance during an initiated said sequence.

6. The suppressor of claim 5, said impedance means comprising a switch tube having a control grid normally biased for conduction in the absence of a transmitter signal and transiently biased to nonconduction in response to a transmitter signal passed by said amplifier.

7. The suppressor of claim 6 including vacuum tube transfer means passing said amplifier signal to said switch tube grid during intervals of nonconduction of first said tube and including grid biasing means preventing transfer of said amplifier signal during intervals of conduction of first said tube.

8. The suppressor of claim 6, including a second switch tube biased for conduction of signals from the amplifier, a third switch tube having biasing means responsive to conduction in said first tube effectively biasing the first switch tube for conduction except while said first tube is conducting thereby rendering the suppressor operative or nonoperative selectively in accordance with prior existence of conduction in the first said tube.

9. Apparatus for preventing the spurious activation of the reply transmitter of a beacon transpondor in response to the detection by its receiver of a search pulse radiated from an adjacent radar search transmitter and for permitting the activation of said reply transmitter in response to the detection by its receiver of an interrogation pulse radiated from a remote radar transmitter comprising, in combination, means for obtaining from said adjacent radar search transmitter a control pulse for every search pulse radiated therefrom, a first pulse generator, means for coupling said control pulse to said pulse generator for activating said generator and producing a first output pulse, said control pulse appearing at said coupling means prior to the detection by said beacon receiver of the corresponding search pulse radiated from said adjacent radar search transmitter, a second pulse generator, said second pulse generator being connected between the receiver and the reply transmitter of said beacon transpondor and adapted normally to be activated by every pulse detected by said receiver to generate a second output pulse for instituting the radiation of a reply pulse by said beacon transmitter, means responsive to the production of a first output pulse for preventing the activation of said second pulse generator by any pulses detected by said receiver during the time duration of said first output pulse, and means responsive to the activation of said second pulse generator at all other times for rendering said coupling means inoperative for the duration of said second output pulse whereby any trigger pulses obtained during the existence of this second output pulse are incapable of activating said first pulse generator.

10. In an apparatus of the type described in claim 9 wherein said first and second pulse generators are each monostable multivibrators and wherein said coupling means comprise an amplifying stage normally biased for conduction and capable of passing control pulses from its input to its output circuit.

11. In apparatus of the type mentioned in claim 9 wherein said second pulse generator is a monostable multivibrator and wherein said means of preventing the operation of said monostable multivibrator includes a triode normally biased for conduction and in series with the cathode of the normally nonconducting tube of said multivibrator, a high impedance network in parallel with said triode, the magnitude of said impedance being such that said normally nonconducting tube is prevented from remaining conducting when said triode is nonconducting and wherein said triode is furnished plate potential only when said normally nonconducting tube is driven to conduction, and means for coupling a first output pulse to the control grid of said triode for preventing its conduction for the duration of this first output pulse and thereby precluding the operation of said monostable multivibrator.

12. In an apparatus of the type described in claim 11 wherein said coupling means comprise an amplifying stage normally biased for conduction and adapted to pass control pulses from its input to its output circuit and wherein said means responsive to the activation of said second pulse generator for rendering said coupling means inoperative comprises a feedback circuit for applying a blocking signal to the amplifying stage for rendering this stage inoperative and blocking the passage of said control pulse to said output circuit, said blocking signal having a time duration corresponding to that of said second output pulse.

References Cited in the file of this patent

UNITED STATES PATENTS

| Number | Name | Date |
|---|---|---|
| 1,894,019 | Buckley | Jan. 10, 1933 |
| 2,132,599 | Baumann | Oct. 11, 1938 |
| 2,321,698 | Nolde | June 15, 1943 |
| 2,403,429 | Anderson | July 9, 1946 |
| 2,403,600 | Holmes | July 9, 1946 |
| 2,416,223 | Sanders | Feb. 18, 1947 |
| 2,419,541 | De Rosa | Apr. 29, 1947 |
| 2,420,211 | Tourshou | May 6, 1947 |
| 2,427,191 | Brink | Sept. 9, 1947 |
| 2,460,202 | Tyson | Jan. 25, 1949 |
| 2,531,393 | Burnight et al. | Nov. 28, 1950 |

OTHER REFERENCES

Serial No. 429,583, De France (A. P. C.), published June 15, 1943.